US012620378B2

(12) United States Patent
Ohba et al.

(10) Patent No.: US 12,620,378 B2
(45) Date of Patent: May 5, 2026

(54) KEYBOARD UNIT

(71) Applicant: YAMAHA CORPORATION, Hamamatsu (JP)

(72) Inventors: Akito Ohba, Hamamatsu (JP); Hirotsugu Kamiya, Hamamatsu (JP); Hiroyuki Yamano, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 576 days.

(21) Appl. No.: 18/156,553

(22) Filed: Jan. 19, 2023

(65) Prior Publication Data

US 2023/0237982 A1 Jul. 27, 2023

(30) Foreign Application Priority Data

Jan. 24, 2022 (JP) ................................ 2022-008844

(51) Int. Cl.
*G10H 1/34* (2006.01)
*G10C 3/12* (2006.01)

(52) U.S. Cl.
CPC ............... *G10H 1/346* (2013.01); *G10C 3/12* (2013.01)

(58) Field of Classification Search
CPC ............. G10H 1/346; G10H 2220/271; G10H 1/0008; G10C 3/12
See application file for complete search history.

(56) References Cited

U.S. PATENT DOCUMENTS

2018/0286367 A1 10/2018 Tanque

FOREIGN PATENT DOCUMENTS

EP 2784332 A1 10/2014
JP 2013073006 A 4/2013
JP 2018180527 A 11/2018

OTHER PUBLICATIONS

Office Action issued in Chinese Appln. No. 202310062705.5 mailed Apr. 30, 2025.
Office Action issued in Chinese Appln. No. 202310062705.5 mailed Oct. 31, 2025. English machine translation provided.

*Primary Examiner* — Kimberly R Lockett
(74) *Attorney, Agent, or Firm* — ROSSI, KIMMS & McDOWELL LLP

(57) ABSTRACT

A keyboard unit includes a frame; a first member connected to the frame, a rigidity of the first member in a first direction being lower than a rigidity of the first member in a second direction intersecting with the first direction; and a mounted member. The mounted member includes a first pressing portion configured to suppress a movement of the first member in the first direction by pressing a part of the first member in the second direction, and a positioning portion configured to suppress a movement of the mounted member with respect to the frame in the first direction.

16 Claims, 13 Drawing Sheets

KEYBOARD UNIT

CROSS REFERENCE TO RELATED APPLICATIONS

This application claims the benefit of priority to Japanese Patent Application No. 2022-008844, filed on Jan. 24, 2022, the entire contents of which are incorporated herein by reference.

FIELD

An embodiment of the present disclosure relates to a keyboard unit. In particular, an embodiment of the present disclosure relates to a keyboard unit having a configuration in which a mounted member is attached to a frame.

BACKGROUND

Generally, in an electronic musical instrument, a mounted member is attached to a frame by a fastener such as a screw. Usually, a through hole is arranged in the mounted member. The mounted member is attached to the frame by connecting the fastener to the frame through the through hole. For example, in Japanese laid-open patent publication No. 2018-180527, a plate-shaped member (circuit substrate) arranged with a sensor is fixed to a frame by screws. In such a configuration, considering the dimensional differences between the shape of the frame and the shape of the mounted member (circuit substrate), the size of the through hole arranged in the mounted member may be designed to be larger than the size of the fastener in a specific direction.

SUMMARY

A keyboard unit according to an embodiment of the present disclosure includes a frame, a first member connected to the frame, a rigidity of the first member in a first direction being lower than a rigidity of the first member in a second direction intersecting with the first direction and a mounted member. The mounted member includes a first pressing portion configured to suppress a movement of the first member in the first direction by pressing a part of the first member in the second direction, and a positioning portion configured to suppress a movement of the mounted member with respect to the frame in the first direction.

DESCRIPTION OF EMBODIMENTS

Figure 1:
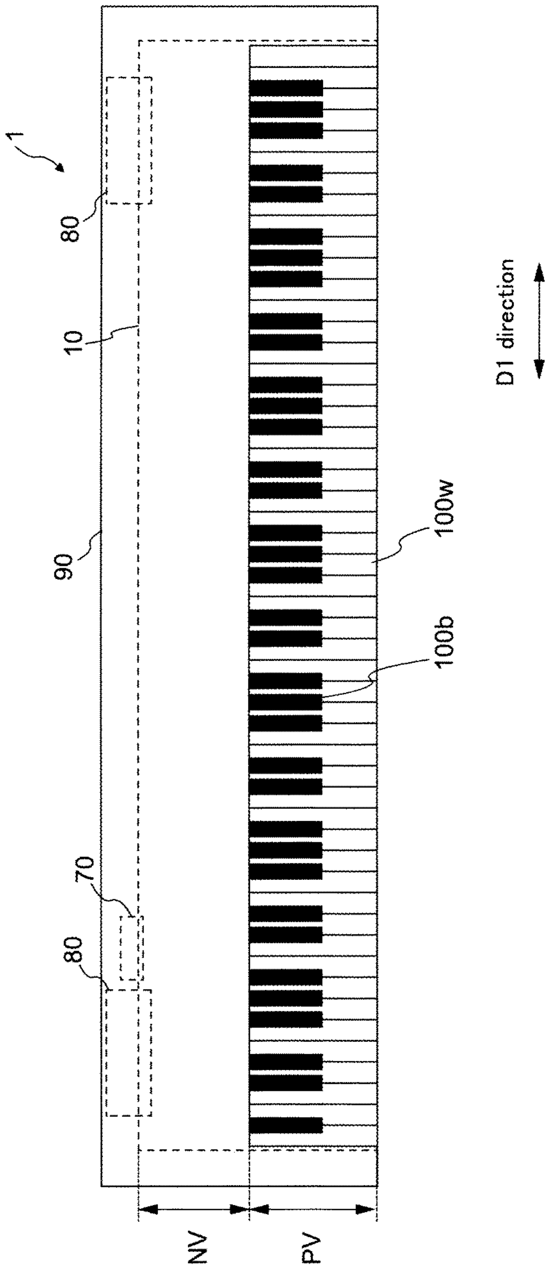
FIG. 1 is a diagram showing a configuration of a keyboard unit according to an embodiment of the present disclosure.

Hereinafter, a keyboard unit according to an embodiment of the present disclosure will be described in detail with reference to the drawings. The following embodiments are examples of embodiments of the present disclosure, and the present disclosure is not to be construed as being limited to these embodiments. In the drawings referred to in the present embodiment, the same or similar parts are denoted by the same symbols or similar symbols (only denoted by A, B, etc. after the numerals). Repeated descriptions of the above-described symbols may be omitted. A dimensional ratio (ratio between components, the ratio in the vertical, lateral, and height directions, and the like) of the drawings may be different from an actual ratio for convenience of explanation, and a part of the configuration may be omitted from the drawings. In the following description, based on the vertical direction in the drawings, expressions such as "above", "upper", "upper end", "below", "lower", and "lower end" may be used. However, these vertical directions merely describe the relationship between the relative directions, and the vertical direction may be reversed.

1. First Embodiment

[1-1. Configuration of Keyboard Unit]

FIG. 1 is a diagram showing a configuration of a keyboard unit according to a first embodiment. For example, a keyboard unit 1 is an electronic keyboard instrument such as an electronic piano that sounds according to a key depression by a user (performer). The keyboard unit 1 may be a keyboard-type controller that outputs control data (for example, MIDI) for controlling an external sound source apparatus according to a key depression. In this case, the keyboard unit 1 may not have the sound source apparatus.

The keyboard unit 1 includes a keyboard assembly 10. The keyboard assembly 10 includes a white key 100*w* and a black key 100*b*. If the white key 100*w* and the black key 100*b* do not need to be distinguished, they are simply referred to as a key 100. A plurality of white keys 100*w* and a plurality of black keys 100*b* are arranged side by side. The number of keys 100 is N, 88 in this example. The direction in which these keys 100 are arranged is referred to as a scale direction (direction D1). The keyboard unit 1 has a longitudinal shape in the direction D1. In the following description, a configuration in which "w" is added to a symbol (number) means a configuration corresponding to a white key. A configuration in which "b" is added to a symbol (number) means a configuration corresponding to a black key.

A portion of the keyboard assembly 10 exists inside a housing 90. When the keyboard unit 1 is viewed from above, a part of the keyboard assembly 10 covered with the housing 90 is referred to as a non-appearance part NV, and a part exposed from the housing 90 and visible to the user is referred to as an appearance part PV. That is, the appearance part PV is a part of the key 100 and indicates an area that can be played by the user. Hereinafter, a part of the key 100 exposed by the appearance part PV may be referred to as a key body portion.

A sound source apparatus 70 and a speaker 80 are arranged inside the housing 90. The sound source apparatus 70 generates a sound waveform signal according to the depression of the key 100. The speaker 80 outputs the sound wave shape signal generated by the sound source apparatus 70 to an external space. The keyboard unit 1 may include a slider for controlling the volume, a switch for switching tones, a display for displaying various kinds of information, and the like.

In the description of the present specification, directions such as above, below, left, right, front, and back indicate directions when the keyboard unit 1 is viewed from a player when playing. For example, the non-appearance part NV can be expressed as being located at the back side of the appearance part PV. In some cases, the key 100 is used as a reference, for example, the key front end side (key front side) or the key rear end side (key rear side). In this case, the key front end side is the front side of the key 100 as viewed by the player. The key rear end side is behind the key 100 as viewed by the player. According to the above definition, it can be expressed that, among the black key 100*b*, the front end to the rear end of the key body portion of the black key 100*b* is a portion protruding upward from the white key 100*w*.

Figure 2:
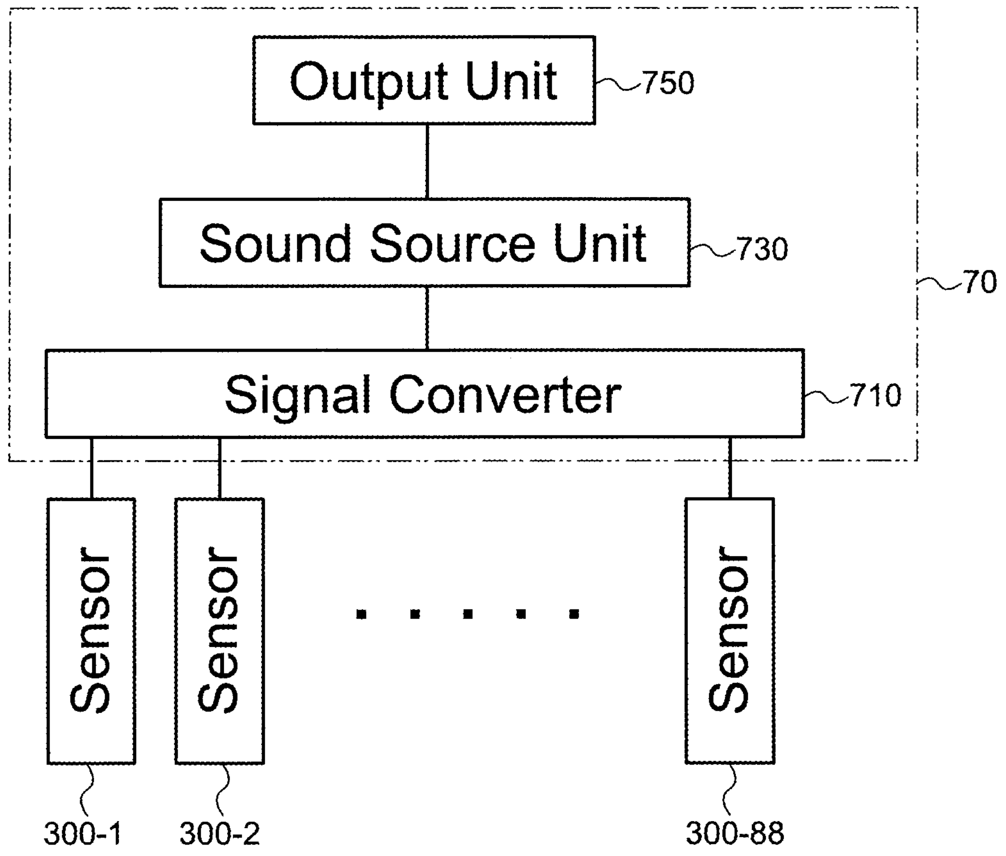
FIG. 2 is a block diagram showing a configuration of a sound source apparatus according to an embodiment of the present disclosure.

FIG. 2 is a block diagram showing a configuration of a sound source apparatus according to the first embodiment. The sound source apparatus 70 includes a signal converter 710, a sound source unit 730, and an output unit 750. A sensor 300 is arranged corresponding to each key 100. The sensor 300 detects a key operation and outputs a signal corresponding to the detected content. In this example, the sensor 300 outputs a signal according to the three levels of key depression. A keypress speed can be detected according to the time intervals of these signals.

The signal converter 710 acquires output signals of the sensor 300 (sensors 300-1, 300-2, . . . , and 300-88 corresponding to the 88 keys 100), and generates and outputs operation signals corresponding to the operation states of each key 100. In this example, the operation signal is a signal in MIDI format. According to the keypress operation, the signal converter 710 outputs a note on. A velocity corresponding to the key number and the keypress speed indicating which of the 88 keys 100 is operated is output in association with the note on. On the other hand, the signal converter 710 outputs the key number and note off in association with each other according to a key release operation. A signal corresponding to another operation such as a pedal may be input to the signal converter 710 and reflected in the operation signal.

The sound source unit 730 generates a sound waveform signal based on the operation signal output from the signal converter 710. The output unit 750 outputs the sound waveform signal generated by the sound source unit 730. For example, the sound waveform signal is output to the speaker 80 or a sound waveform signal output terminal.

[1-2. Configuration of Keyboard Assembly]

Figure 3:
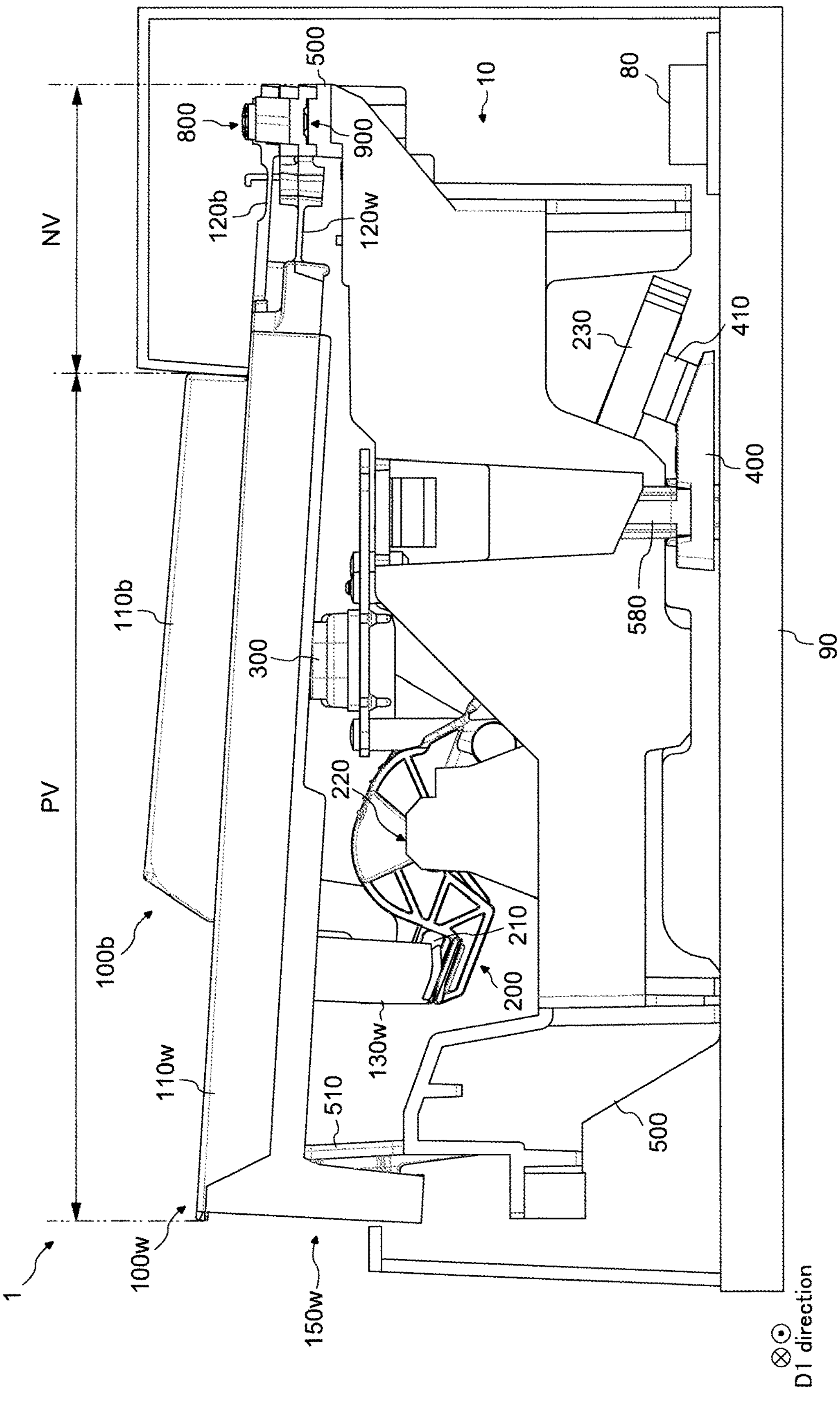
FIG. 3 is an explanatory diagram of a configuration of the inside of a housing according to an embodiment of the present disclosure when viewed from a side.

FIG. 3 is an explanatory diagram of a configuration of the inside of the housing according to the first embodiment when viewed from a side. Although a configuration related to the white key 100*w* is exemplified and described below, a hammer assembly 200 according to the present embodiment may be applied to a configuration related to the black key 100*b*. As shown in FIG. 3, the keyboard assembly 10 and the speaker 80 are arranged inside the housing 90. The speaker 80 is arranged behind the keyboard assembly 10. The speaker 80 is arranged to output a tone corresponding to the key depression toward the upper and lower sides of the housing 90. The sound output downward proceeds from the lower surface of the housing 90 to the outside. On the other hand, the sound output upward passes from the inside of the housing 90 through the space inside the keyboard assembly 10, and proceeds to the outside from a gap between the adjacent white keys 100*w* in the appearance portion PV or from a gap between the white key 100*w* and the housing 90.

A configuration of the keyboard assembly 10 will be described with reference to FIG. 3. The keyboard assembly 10 includes the hammer assembly 200, a stopper rail 400, a frame 500, a connection portion 800, and a mounting portion 900 in addition to the white key 100*w* and the sensor 300 described above. The keyboard assembly 10 is a resin structure body in which most components are manufactured by injection molding or the like. The frame 500 is fixed to the housing 90. The stopper rail 400 and the mounting portion 900 are fixed to the frame 500. The connection portion 800 is attached to the mounting portion 900 and connects the white key 100*w* to the frame 500 rotatably. The white key 100*w* includes a key body portion 110*w* and a key support portion 120*w*. The key body portion 110*w* is connected to the connection portion 800 via the key support portion 120*w*. The key support portion 120*w* is a plate-shaped member. A part of the key support portion 120*w* is thinner in the plate thickness direction than the other parts and has flexibility. The white key 100*w* rotates with respect to the frame 500 by bending a part of the key support portion 120*w* due to the flexibility.

The white key 100*w* includes a front end key guide 150*w*. The front end key guide 150*w* slidably contacts a front end frame guide 510 while covering the front end frame guide 510 of the frame 500. The front end key guide 150*w* contacts the front end frame guide 510 on both the upper and lower sides of the front end key guide 150*w* in the direction D1. On the other hand, a member corresponding to the front end key guide 150*w* is not arranged in the black key 100*b*.

The hammer assembly 200 is rotatably attached to a shaft portion arranged in the frame 500. As will be described later, a bearing portion 220 arranged in the hammer assembly 200 is rotatably attached to the shaft portion. A front end member 210 of the hammer assembly 200 contacts the hammer support portion 130*w* in the interior space of the hammer support portion 130*w* in the white key 100*w* so as to be slidable substantially in the front-rear direction. The sliding portion, i.e., the portion where the front end member 210 contacts the hammer support portion 130*w*, is located below the white key 100*w* in the appearance portion PV (forward of the rear end of the key body portion 110*w*).

The hammer assembly 200 includes a metallic weight portion 230 behind a rotating shaft of the hammer assembly 200. When the key is released (when the key is not depressed), the weight portion 230 is placed on a lower stopper 410, and the front end member 210 of the hammer assembly 200 pushes the white key 100*w* upward. When the key is depressed, the weight portion 230 moves upward and collides with an upper stopper (not shown). That is, the hammer assembly 200 rotates according to the movement of the white key 100*w*. With this weight portion 230, the hammer assembly 200 applies weight for the key depression. The lower stopper 410 and the upper stopper are formed of a cushioning material or the like (a nonwoven fabric, an elastic body, or the like).

The sensor 300 is attached to the frame 500 above the weight portion 230. When the sensor 300 is crushed on the upper surface side of the weight portion 230 by the key depression, the sensor 300 outputs a detection signal. As described above, the sensor 300 is arranged corresponding to each key 100.

A boss 580 is connected to the frame 500. The boss 580 extends downward from the frame 500. As will be described later, the stopper rail 400 is connected to a lower end of the boss 580 by a fastening member 600 (refer to FIG. 5).

Figure 4:
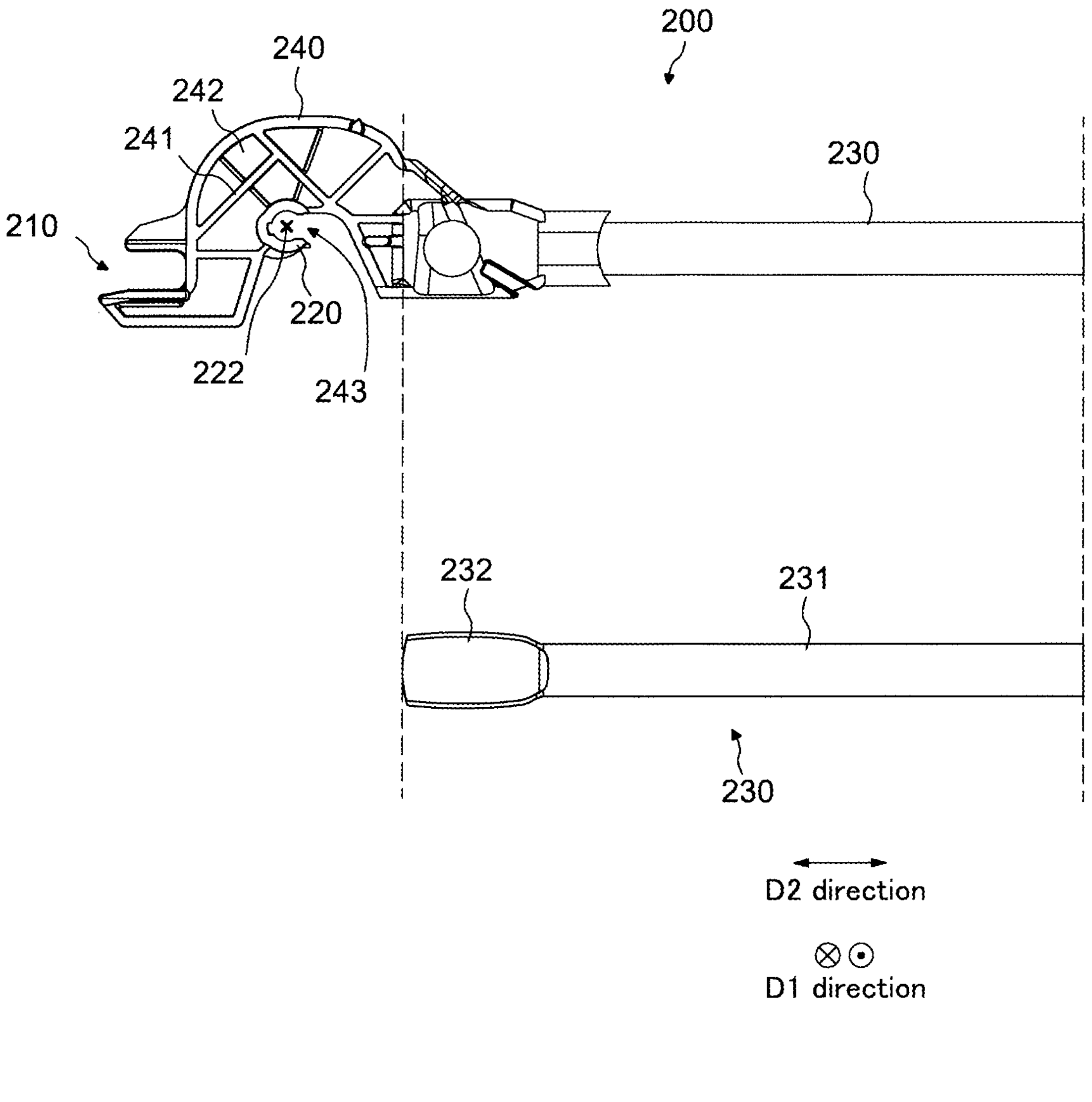
FIG. 4 is a side view showing an example of a hammer assembly according to an embodiment of the present disclosure.

FIG. 4 is a side view showing an example of a hammer assembly according to an embodiment of the present disclosure. As shown in FIG. 4, the hammer assembly 200 includes the front end member 210, the bearing portion 220, the weight portion 230, and a body member 240.

The body member 240 is a member that constitutes the main part of the hammer assembly 200 except the weight portion 230 and functions as a frame of the hammer assembly 200. The body member 240 includes a rib 241 and a concave portion 242. While the rigidity of the body member 240 is ensured by the rib 241, the weight of the body member 240 is reduced by the concave portion 242.

The front end member 210 is slidably attached to the hammer support portion 130*w* as described above. The front end member 210 protrudes from the body member 240 in a direction away from the bearing portion 220. The front end member 210 has a bifurcated protruding portion in the vertical direction. The hammer support portion 130*w* slides in a portion of a groove between the two protruding portions.

The bearing portion 220 has a shape that can be attached to the shaft portion. Specifically, the bearing portion 220 is constituted by an arcuate inner wall, and an opening 243 for attachment to shaft portion is arranged. In the case where the hammer assembly 200 is attached to the shaft portion, the hammer assembly 200 moves so that the shaft portion passes through the opening 243 and reaches the interior of the bearing portion 220. The bearing portion 220 is attached to the shaft portion in a Snap-Fit format. The hammer assembly 200 rotates about a center of rotation 222.

The weight portion 230 is fixed to the body member 240 and extends in a direction opposite to the front end member 210. That is, the weight portion 230 is rod-shaped. The weight portion 230 removed from the body member 240 is shown below the hammer assembly 200 of FIG. 4. The weight portion 230 includes a first portion 231 and a second portion 232. The first portion 231 is cylindrical. The second portion 232 has a shape obtained by partially crushing the first portion 231. The second portion 232 is a portion covered by the body member 240.

As described above, the hammer assembly 200 rotates about the center of rotation 222 by the weight of the weight portion 230 and is supported by the lower stopper 410 arranged on the stopper rail 400. The stopper rail 400 extends in the direction D1 and supports a plurality of weight portions 230 arranged in the keyboard unit 1.

Here, in the configuration disclosed in Japanese laid-open patent publication No. 2018-180527, when the stopper rail 400, which is one of the mounted member, is attached to the frame 500 by using a fastener, the relative positional relationship of the mounted member with respect to the frame 500 may deviate from a proper positional relationship when the fastener is fastened. As described above, if the relative positional relationship deviates from the proper position, a fastened member is fixed to the frame 500 with the frame 500 or the mounted member distorted. As a result, the distorted member and other members may interfere with each other, resulting in an operation failure of the keyboard unit. According to the configurations of the stopper rail 400 and the frame 500 described below, it is possible to provide a keyboard unit in which an operation failure is less likely to occur.

[1-3. Configuration of Stopper Rail 400 and Frame 500]

Figure 5:
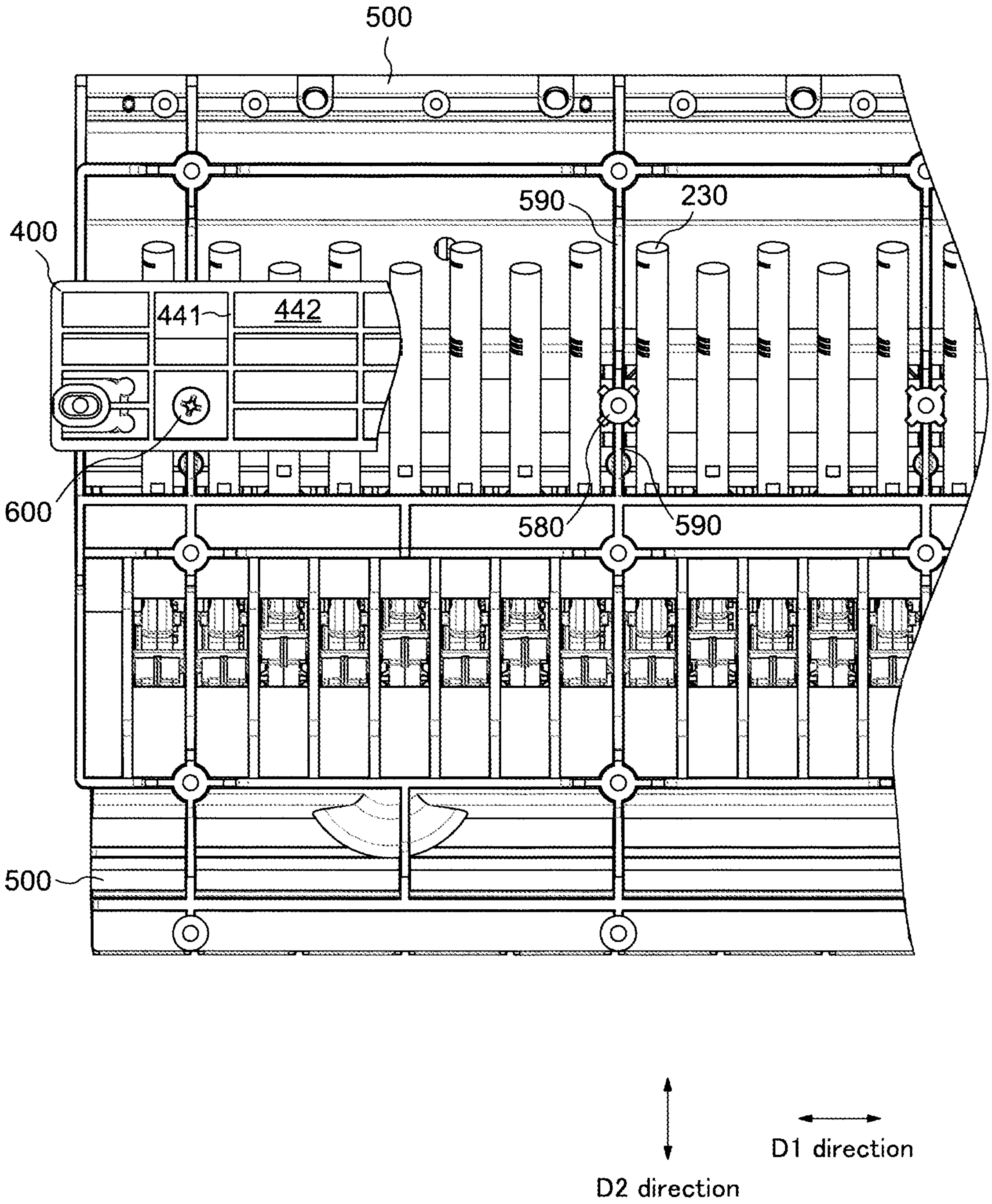
FIG. 5 is an explanatory diagram of a configuration of the inside of a housing according to an embodiment of the present disclosure when viewed from a bottom surface.

FIG. 5 is an explanatory diagram of a configuration of the inside of the housing according to an embodiment of the present disclosure when viewed from a bottom surface. FIG. 5 is a diagram when the keyboard unit 1 shown in FIG. 3 is viewed from below. In FIG. 5, for convenience of explanation, a part of the stopper rail 400 is omitted, and the weight portion 230 arranged above the stopper rail 400 is visually recognized. A rib 590 is connected to the frame 500 and extends from the frame 500 in a direction D2. The rib 590 extends in the direction D2 between the adjacent weight portions 230 of a portion of the plurality of hammer assembly 200. In the case of FIG. 5, the rib 590 is arranged between the adjacent white keys 100*w* without sandwiching the black key 100*b*. That is, the positions of rear ends of the adjacent weight portions 230 via the rib 590 is the same. Since the space between the adjacent white key 100*w* without the black key 100*b* interposed therebetween is larger than the space between the black key 100*b* and the white key 100*w*, it is possible to arrange the boss 580 and the rib 590 large enough to ensure sufficient strength.

The boss 580 is connected to the rib 590 and is arranged between the adjacent weight portions 230. A detailed configuration of the boss 580 will be described later. A through hole 420 is arranged in the stopper rail 400 as will be described later. The stopper rail 400 is connected to the frame 500 by connecting the fastening member 600 to the boss 580 through the through hole 420. A rib 441 and a concave portion 442 are arranged on the bottom surface of the stopper rail 400. The rib 441 has a lattice shape extending in the direction D1 and the direction D2, and surrounds the concave portion 442. While the rigidity of the stopper rail 400 is ensured by the rib 441, the weight of the stopper rail 400 is reduced by the concave portion 442.

As shown in FIG. 3, when the key is released, the stopper rail 400 supports the plurality of weight portions 230 via the lower stopper 410. Therefore, in order to stably support the load of the weight portion 230, the stopper rail 400 is preferably configured to be connected to the frame 500 near a position where the weight portion 230 is in contact with the stopper rail 400 (the lower stopper 410). On the other hand, since the hammer assembly 200 (mainly the weight portion 230) extends in the direction D2, the frame 500 and the boss 580 are connected by the rib 590 extending in the direction D2 in order to realize the above-described configuration. That is, a first edge portion of the rib 590 is connected to the frame 500 and a second edge portion of the rib 590 is connected to the boss 580. In other words, the boss 580 is bridged by the rib 590 between the frame 500, which has the shape of sandwiching the hammer assembly 200 in the direction D2.

[1-4. Connection Between Stopper Rail 400 and Frame 500]

As described above, the rib 590 has a longitudinal shape in the direction D2. In particular, in the present embodiment, the rib 590 is bridged between parts of the frame 500 which opposite each other in the direction D2. Therefore, the rib 590 has high rigidity in the direction D2 but weak rigidity in the direction D1. Therefore, in the case where external pressure is applied to the boss 580 or the rib 590 in the direction D1, the rib 590 is distorted in the direction D1, and the position of the boss 580 deviates from the proper position in the direction D1. Therefore, if the amount of movement of the boss 580 is large, the boss 580 or the rib 590 interferes with the weight portion 230.

For example, in the case where a screw is used as the fastening member 600, the rib 590 may be distorted by external pressure when the screw is screwed into the boss 580 and tightened, and the stopper rail 400 may be fixed to the boss 580 with the position of the boss 580 in the direction D1 deviated from the proper position. For example, in the case where the first fastening member 600 is connected to the first boss 580 in the proper position and the second fastening member 600 is connected to the second boss 580 out of the proper position, the distance between the first boss 580 and the second boss 580 will be an incorrect distance. As a result, as described above, the boss 580 may interfere with the weight portion 230.

The configuration described in the keyboard unit 1 according to the present embodiment is a configuration for suppressing the above-described problem, as will be described below. The stopper rail 400 may be referred to as a "fastened member". The boss 580 and the rib 590 may be collectively referred to as a "first member". In this case, it can be said that the first member has less rigidity in the direction D1 (first direction) than in the direction D2 (second direction). In the present embodiment, the configuration in which the direction D1 (first direction) and the direction D2 (second direction) of the key 100 are orthogonal to each other has been exemplified, but not limited to the configuration, and it is sufficient that these directions intersect. In other words, in the second direction, the first member is connected to the frame 500 at its edge portion. In other words, in the second direction, the first member is bridged between parts of the frame 500 which opposite each other. In other words, the edge portion of the first member in the second direction is connected to the frame 500.

As shown in FIG. 5, the boss 580 and the rib 590 (first member) are adjacent to the weight portion 230, which is a member constituting the keyboard unit 1 in the direction D1. Specifically, the first member is arranged between the weight portions 230 adjacent to each other in the direction D1.

[1-5. Configuration of Stopper Rail 400]

Figure 6:
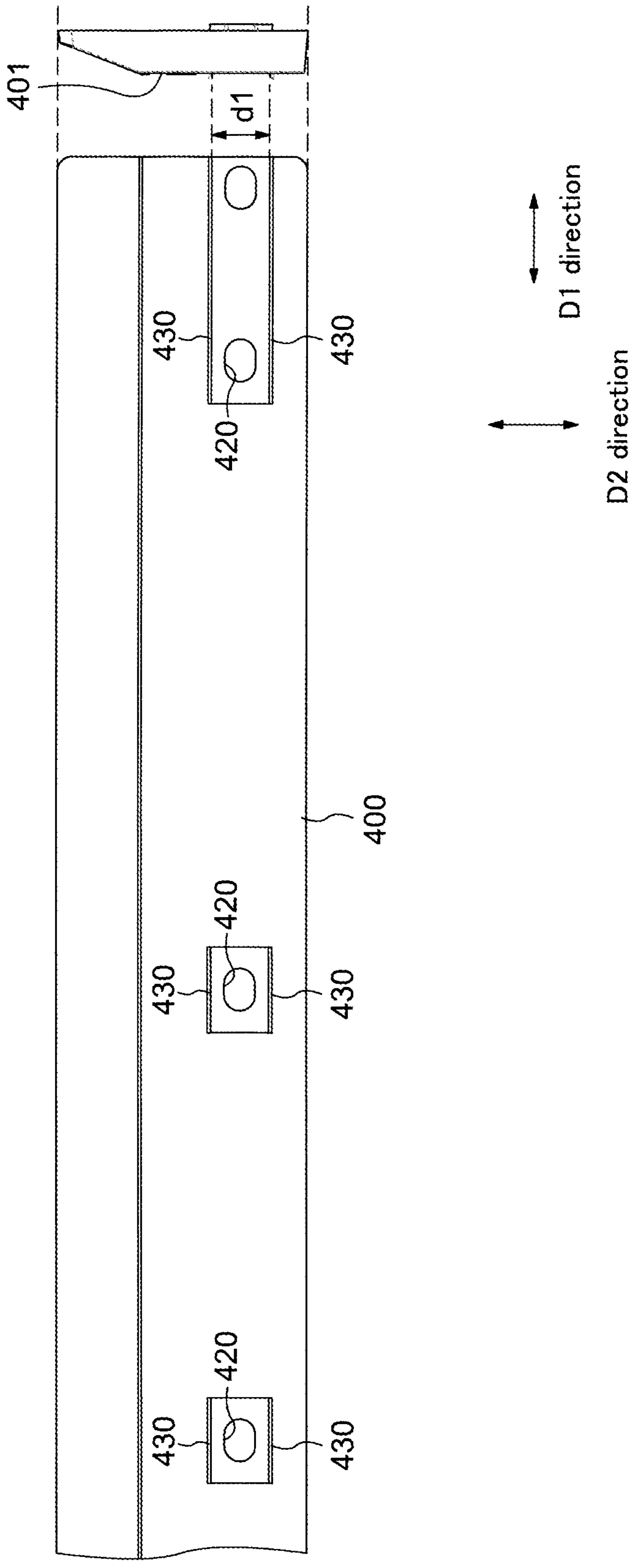
FIG. 6 is a diagram showing a stopper rail according to an embodiment of the present disclosure.

FIG. 6 is a diagram showing a stopper rail according to an embodiment of the present disclosure. As shown in FIG. 6, the through hole 420 and a pressing portion 430 are arranged on the stopper rail 400. The pressing portion 430 may be referred to as a "first pressing portion".

The through hole 420 is arranged corresponding to the position of the boss 580. The stopper rail 400 is fixed to the boss 580 (or the first member) by connecting the fastening member 600 to the boss 580 penetrating the through hole 420. The shape of the through hole 420 is a shape having a longitudinal shape in the direction D1 of the stopper rail 400. The direction D1 corresponds to the scale direction when the stopper rail 400 is attached to the frame 500. As will be described later, in the direction D1, a width of the through hole 420 is larger than the width of the fastening member 600 penetrating the through hole 420.

The stopper rail 400 connects a plurality of bosses 580 arranged in the direction D1. Therefore, if the dimensional difference of the stopper rail 400 occurs in the direction D1, the positional deviation between the boss 580 and the through hole 420 near both ends in the direction D1 increases. Therefore, the through hole 420 having a longitudinal shape in the direction D1 allows the fastening member 600 to be connected to the boss 580 even if the dimensional difference of the stopper rail 400 occurs as described above.

The pressing portion 430 is arranged in a pair so as to sandwich the through hole 420. The pair of pressing portions 430 is arranged to be separated from each other in the direction D2, and both extend in the direction D1. The pair of pressing portions 430 is parallel to each other and has a longitudinal shape in the direction D1. A distance d1 between the pair of pressing portions 430 in the direction D2 is slightly smaller than a width of the boss 580 in the direction D2 in FIG. 5. The pressing portion 430 protrudes upward from an upper surface 401 of the stopper rail 400. The pressing portion 430 is arranged corresponding to the through hole 420. In the case where the adjacent through holes 420 are adjacent to each other, the pressing portion 430 is arranged in common to the adjacent through holes 420. In the case where the adjacent through holes 420 are separated from each other, the pressing portion 430 is individually arranged corresponding to the through hole 420. In the direction D1, a width of the pressing portion 430 is larger than the width of the through hole 420. In the present embodiment, although a configuration in which the pressing portion 430 protrudes upward from the upper surface 401 of the stopper rail 400 is exemplified, the configuration is not limited to this configuration. For example, the pressing portion 430 may have a concave shape recessed from the upper surface 401 toward the inside of the stopper rail 400.

[1-6. Attachment Structure of Stopper Rail 400 to Frame 500]

Figure 7:
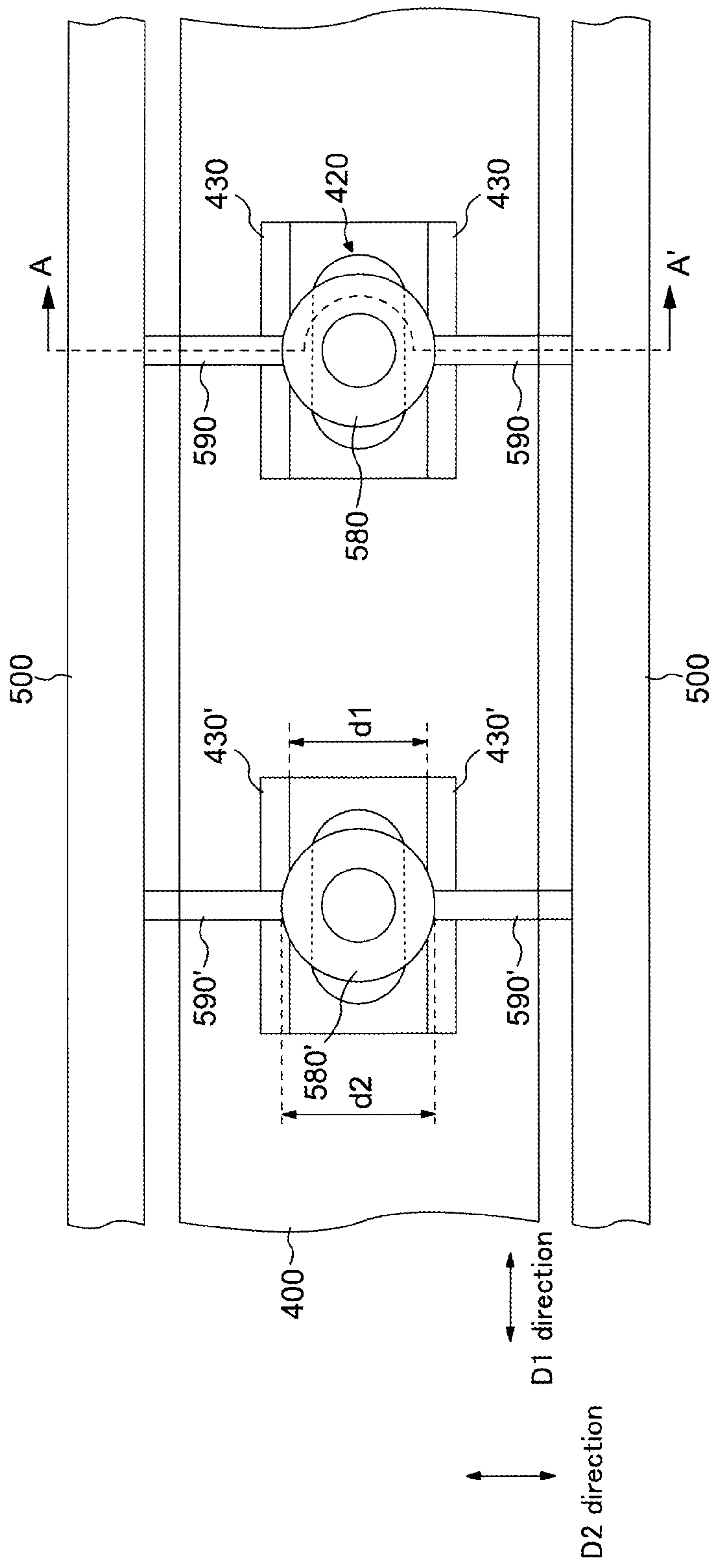
FIG. 7 is a diagram showing a state in which a stopper rail is attached to a frame in an embodiment of the present disclosure.
Figure 8:
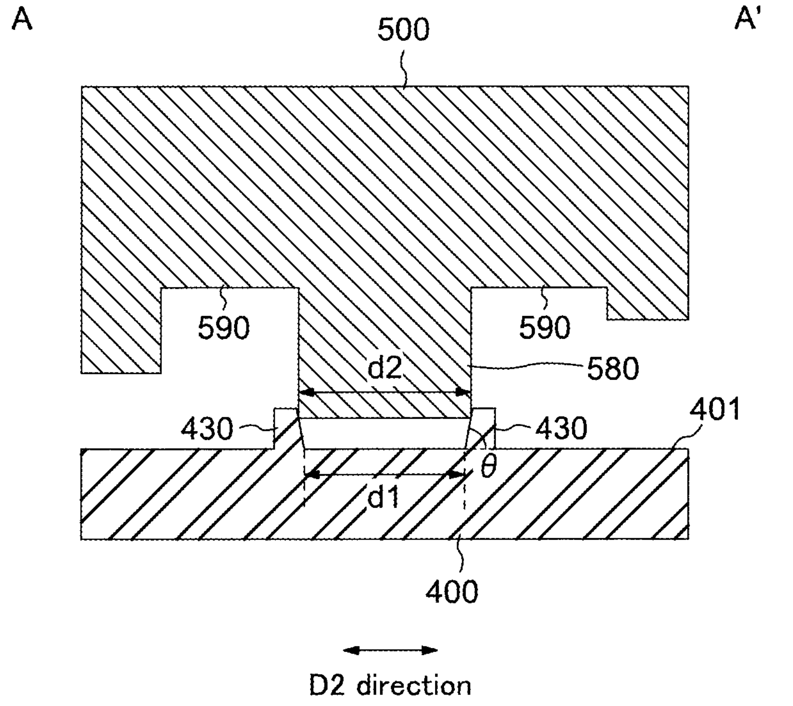
FIG. 8 is a cross-sectional view cut along a line of A-A' of FIG. 7.

FIG. 7 is a diagram showing a state in which a stopper rail is attached to a frame in an embodiment of the present disclosure. FIG. 8 is a cross-sectional view cut along a line of A-A' of FIG. 7. FIG. 7 is a diagram showing the stopper rail 400 as viewed from above in a state where the stopper rail 400 is attached to the frame 500, and is a schematic diagram showing a positional relationship between the boss 580 and the pressing portion 430. In FIG. 7, for convenience of explanation, the shape of the boss 580 is illustrated in a simplified manner. As will be described in detail later, in FIG. 7, a configuration indicated by a symbol without "'(dash)" is a configuration of an object to be attached by the fastening member 600. On the other hand, a configuration indicated by a symbol with'"(dash)" is a configuration that is not yet attached by the fastening member 600.

As shown in FIG. 7, the boss 580 is arranged between the pair of pressing portions 430. In the present embodiment, in the direction D2, the distance d1 between the pair of pressing portions 430 is smaller than a width d2 of the boss 580, so that the boss 580 overlaps with a part of the pressing portion 430 in a top view. As shown in FIG. 8, a side wall of the pressing portion 430 has a tapered shape. That is, an angle θ formed between the side wall of the pressing portion 430 and the upper surface 401 is less than 90°. In this case, the distance d1 is the distance between the lower end on the tapered side wall (or the shortest distance between the opposing side walls).

Since the width d2 of a tip of the boss 580 (lower end of the boss 580 in a state of FIG. 8) in the direction D2 is larger than the above described distance d1, the tip of the boss 580 is in contact with the inclined side wall of the pressing portion 430. That is, when the stopper rail 400 is pressed against the frame 500, the boss 580 is pressed against the inclined surface of the pressing portion 430, so that the boss 580 is pressed in the direction D2 by the pressing portion 430. The frictional force between the boss 580 and the pressing portion 430 caused by the pressing by the pressing portion 430 suppresses the boss 580 from moving in the direction D1 (refer to FIG. 7). In other words, the pair of pressing portions 430 sandwiches a part of the boss 580 in the direction D2, thereby suppressing the boss 580 from moving in the direction D1.

In FIG. 8, although a configuration in which the boss 580 directly contacts the pressing portion 430 is exemplified, the configuration is not limited to this configuration. For example, another member may be arranged between the boss 580 and the pressing portion 430, and the boss 580 and the pressing portion 430 may not be in direct contact with each other. Even in such cases, since the boss 580 is pressed in the direction D2 by another member connected to the pressing portion 430, the movement of the boss 580 in the direction D1 is suppressed as described above. The configuration in which another member is arranged between the boss 580 and the pressing portion 430 can be said that the boss 580 and the pressing portion 430 indirectly contacts each other.

The stopper rail 400 connects the plurality of bosses 580 arranged in the direction D1. Therefore, even before the stopper rail 400 is fixed to the frame 500 by the fastening member 600, the plurality of bosses 580 are pressed by the corresponding pressing portions 430, so that it is possible to suppress the movement of the stopper rail 400 in the direction D1. That is, in the case where the process of connecting the fastening member 600 to the boss 580 to be attached is performed, bosses 580' other than the boss 580 to be attached are pressed by pressing portions 430' corresponding to each of the bosses, thereby fixing the position of the boss 580 to be attached in the direction D1. In this case, the bosses 580' other than the boss 580 to be attached may be referred to as "positioning portions" with respect to the boss 580 to be attached. Although the positioning portion displayed in FIG. 7 is a set of pressing portions 430', bosses 580', and ribs 590', the keyboard unit 1 of the present embodiment includes 88 keys 100, and the bosses 580 and 580' are arranged in two places in one octave, so that the positioning portions in the entire keyboard unit 1 are 17 sets of pressing portions 430', bosses 580', and ribs 590'.

In the above case, the boss 580' and the rib 590' may be collectively referred to as a "second member". In this case, it can be said that the second member has less rigidity in the direction D1 (first direction) than in the direction D2 (second direction). The pressing portion 430' corresponding to the boss 580' may be referred to as a "second pressing portion". The pressing portion 430' (the second pressing portion) has the same configuration as the pressing portion 430 (the first pressing portion). Therefore, when the stopper rail 400 is pressed against the frame 500, the boss 580' (a part of the second member) is pressed in the direction D2 by the pressing portion 430' (the second pressing portion). With this configuration, the pressing portion 430' suppresses the boss 580' from moving in the direction D1. Since the pressing portion 430 (the first pressing portion) and the pressing portion 430' (the second pressing portion) are both arranged on the upper surface 401, their positional relationship in the direction D1 is fixed.

Figure 9:
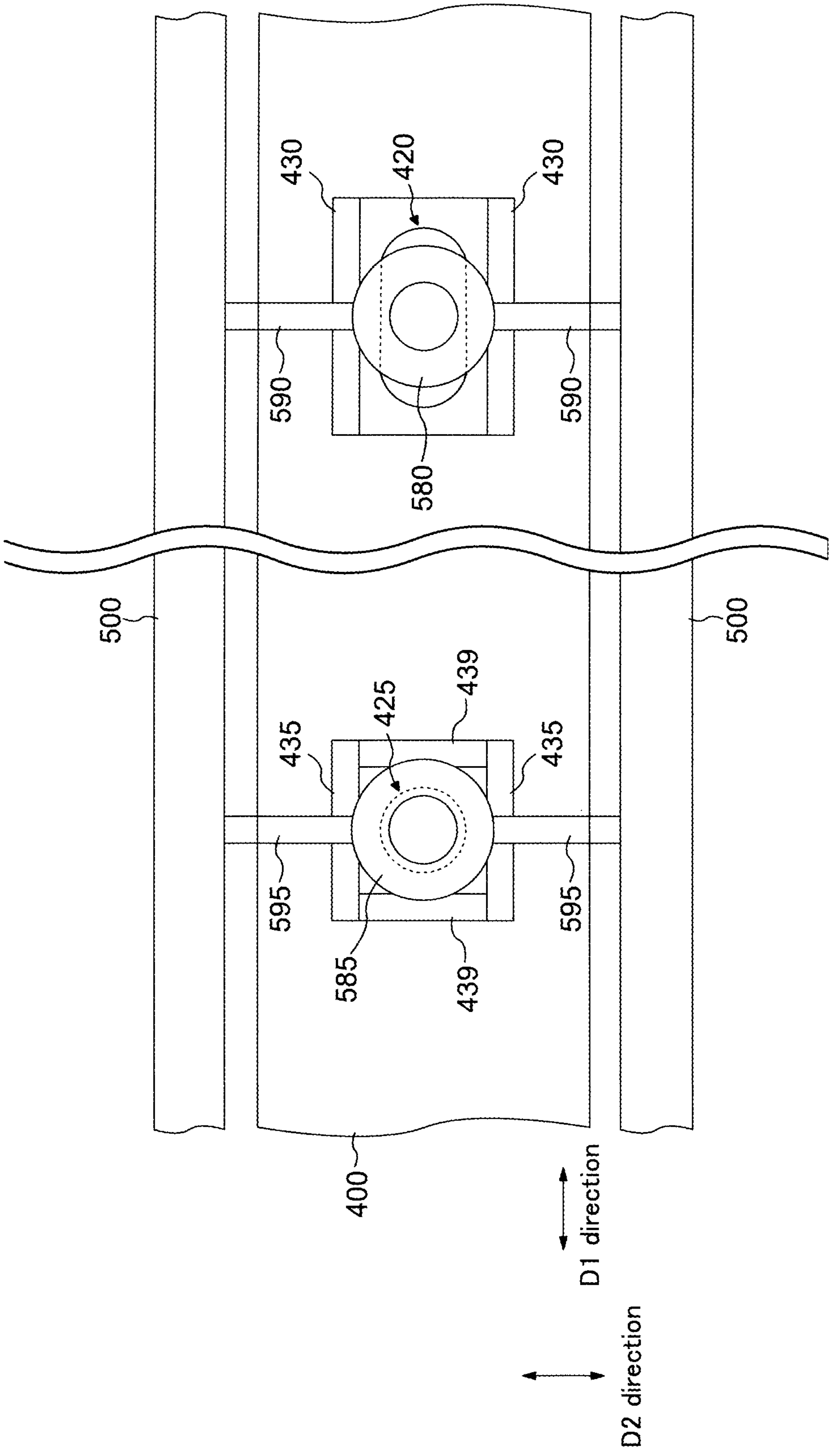
FIG. 9 is a diagram showing a state in which a stopper rail is attached to a frame in an embodiment of the present disclosure.

FIG. 9 is a diagram showing a state in which a stopper rail is attached to a frame in an embodiment of the present disclosure. As shown in FIG. 9, the stopper rail 400 further includes a through hole 425, a pressing portion 435, and a stopper 439. Similarly, a rib 595 extends from the frame 500 in the direction D2, and a boss 585 is arranged at a position corresponding to the through hole 425. The boss 585 and the rib 595 may be collectively referred to as a "second member". The second member (the boss 585 and the rib 595) is arranged at a position closer to the center of the keyboard unit 1 than the first member (the boss 580 and the rib 590) in the direction D1.

The through hole 425 is substantially circular. The pressing portion 435 may be referred to as a "second pressing portion". The stopper 439 is arranged in a pair so as to sandwich the through hole 425. The pair of stoppers 439 is arranged to be separated from each other in the direction D1, and both extend in the direction D2. The pair of stoppers 439 is parallel to each other and has a longitudinal shape in the direction D2. A distance between the pair of stoppers 439 in the direction D1 is the same as the distance d1 between the pair of pressing portions 430. Cross-sectional shapes of the pressing portion 435 and the stopper 439 are the same as the cross-sectional shape of the pressing portion 430. That is, the boss 585 is locked by being in contact with the inclined side wall of the stopper 439, and the movement of the boss 585 in the direction D1 is suppressed. Therefore, the stopper 439 may be referred to as a "positioning portion". Similar to the pressing portions 430 and 435, the stopper rail 400 may be pressed against the frame 500, so that the stopper 439 may press the boss 585 in the direction D1.

Figure 10:
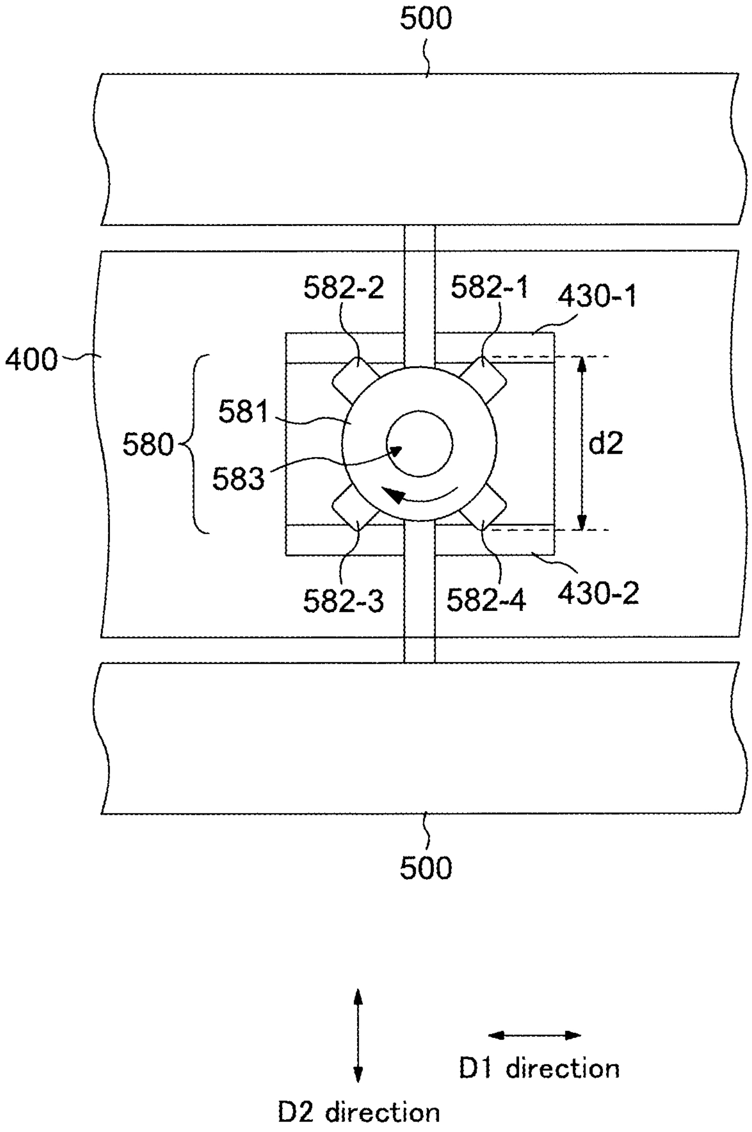
FIG. 10 is a diagram showing a state in which a stopper rail is attached to a frame in an embodiment of the present disclosure.

FIG. 10 is a diagram showing a state in which a stopper rail is attached to a frame in an embodiment of the present disclosure. In FIG. 10, unlike FIG. 7 and FIG. 9, the shape of the boss 580 shown in FIG. 5 is shown without simplification. As shown in FIG. 10, the boss 580 includes a cylindrical portion 581 and a protruding portion 582. In FIG. 10, four protruding portions 582 are arranged around the cylindrical portion 581. If the four protruding portions 582 need to be distinguished, they are called protruding portions 582-1, 582-2, 582-3, and 582-4. Similarly, if the pair of pressing portions 430 needs to be distinguished from each other, they are referred to as pressing portions 430-1 and 430-2. In the case of FIG. 10, a distance between the edge portions of the protruding portion 582 located at both ends in the direction D2 corresponds to the width d2 of the boss 580. That is, in the case of FIG. 10, the protruding portion 582 is in contact with the side wall of the pressing portion 430.

As shown in FIG. 10, the protruding portions 582-1 and 582-2 are in contact with the pressing portion 430-1, respectively, and the protruding portions 582-3 and 582-4 are in contact with the pressing portion 430-2, respectively. The protruding portions 582-1 and 582-2 may be referred to as a "first contacting portion". The protruding portions 582-3 and 582-4 may be referred to as a "second contacting portion". In this case, it can be said that the first contacting portion is in contact with the pressing portion 430-1 at two or more points, or the second contacting portion is in contact with the pressing portion 430-2 at two or more points. The first contacting portion may be in contact with the pressing portion 430-1 at three or more points, and the second contacting portion may be in contact with the pressing portion 430-2 at three or more points.

For example, in the state shown in FIG. 10, when a screw is used as the fastening member 600, a screw hole 583 (or a thread) is formed in the inner wall of the boss 580, and the boss 580 receives an action in the direction indicated by an arrow from the screw when the screw is tightened. The boss 580 tries to rotate due to this cation, but since the protruding portion 582-2 is locked to the pressing portion 430-1 in the rotation direction, the rotation is restricted. Similarly, since the protruding portion 582-4 arranged on the other side of the protruding portion 582-2 based on the cylindrical portion 581 being locked to the pressing portion 430-2, the rotation of the boss 580 is restricted as described above. That is, twisting of the boss 580 is suppressed by the protruding portion 582 and the pressing portion 430.

In the present embodiment, the four protruding portions 582-1 to 4 are arranged in the boss 580, but if the direction of action from the fastening member 600 is predetermined, some protruding portions 582 can be omitted depending on the direction of the action. For example, in the case where a screw is used as the fastening member 600 as described above, since the rotational direction in which the screw is tightened (the rotational direction of the arrow in FIG. 10) is determined, only the protruding portions 582-2 and 582-4 (or only the protruding portion 582-2 or the protruding portion 582-4) may be arranged around the cylindrical portion 581. In other words, when the boss 580 is viewed from above (in a direction in which the bottom of the screw hole 583 is visible), the protruding portion 582-2 is in contact with one of the pressing portion 430-1 of the pair of pressing portions 430 in a clockwise direction in an arc centered on the screw hole 583. When the boss 580 is viewed from above, the protruding portion 582-4 is in contact with the other pressing portion 430-2 of the pair of pressing portions 430 in a clockwise direction in the arc centered on the screw hole 583. As described above, locking the protruding portions 582-2 and 582-4 to the pressing portions 430-1 and 430-2, respectively, makes it possible to prevent the boss 580 from rotating about the center of the screw hole 583.

A part of the protruding portion 582 in contact with the pressing portion 430 is sharper than the outer periphery of the cylindrical portion 581. That is, the radius of curvature of the part of the protruding portion 582 in contact with the pressing portion 430 is smaller than the radius of curvature of the outer periphery of the cylindrical portion 581. That is, the protruding portion 582 is in contact with the pressing portion 430 with strong pressure. In this case, the protruding portion 582 may bite into the side wall of the pressing portion 430. In this case, in the protruding portion 582-2 (the first contacting portion), the pressing portion 430-1 is recessed corresponding to the shape of the protruding portion 582-2 (or the first member). Similarly, in the protruding portion 582-4 (the second contacting portion), the pressing portion 430-2 is recessed corresponding to the shape of the protruding portion 582-4 (or the first member).

In the present embodiment, although a configuration in which the pressing portion 430 presses the boss 580 from both sides of the boss 580 in the direction D2 is exemplified, the configuration is not limited to this configuration. For example, the pressing portion 430 may press the boss 580 from one side of the boss 580 in the direction D2. Even in such cases, the movement of the boss 580 in the direction D1 can be suppressed by a friction between the boss 580 and the pressing portion 430.

In the present embodiment, although a configuration in which the pressing portion 430 presses the boss 580 in the direction D2 because the side wall of the pressing portion 430 is tapered is exemplified, the configuration is not limited to this configuration. For example, the side wall of the pressing portion 430 may be vertical (the angle formed between the side wall and the upper surface 401 is approximately 90°), and the side wall of the boss 580 may have a tapered shape. In the case where both side walls of the pressing portion 430 and the boss 580 are vertical (the angle formed between both side walls and the upper surface 401 is) 90°, the boss 580 may be arranged between the pressing portions 430 while the pressing portion 430 or the boss 580 is elastically deformed, and the pressing portion 430 may press the boss 580 in the direction D2 by the restoring force of the elastically deformed pressing portion 430 or the boss 580. Instead of the pressing portion 430 or the boss 580 being elastically deformed, the pressing portion 430 or the boss 580 may be biased by an elastic member such as a spring, so that the pressing portion 430 presses the boss 580 in the direction D2.

In the present embodiment, although a configuration in which the boss 580 and the rib 590 (first member) are bridged between the frame 500 opposite each other, that is, a configuration in which the edge portion of the first member is connected to the frame 500 is exemplified, the configuration is not limited to this configuration. For example, the boss 580 and the rib 590 protruding upward from the bottom portion may be arranged on the flat plate-shaped bottom portion of the frame 500. The cylindrical portion 581 may have a shape other than a cylinder.

As described above, according to the keyboard unit 1 of the present embodiment, for example, in the case where a mounted member such as the stopper rail 400 is attached to the frame 500 by using the fastening member 600, it is possible to prevent the stopper rail 400 from being displaced from a proper position when the fastening member 600 is fastened. As a result, for example, the boss 580 or the rib 590 to which the fastening member 600 is attached can interfere with the members adjacent them (for example, the weight portion 230 of the hammer assembly 200, and the like) to prevent the operation of the keyboard unit 1 from being defective.

2. Second Embodiment

[2-1. Attachment Structure of Stopper Rail 400A to Frame 500A]

Figure 11:
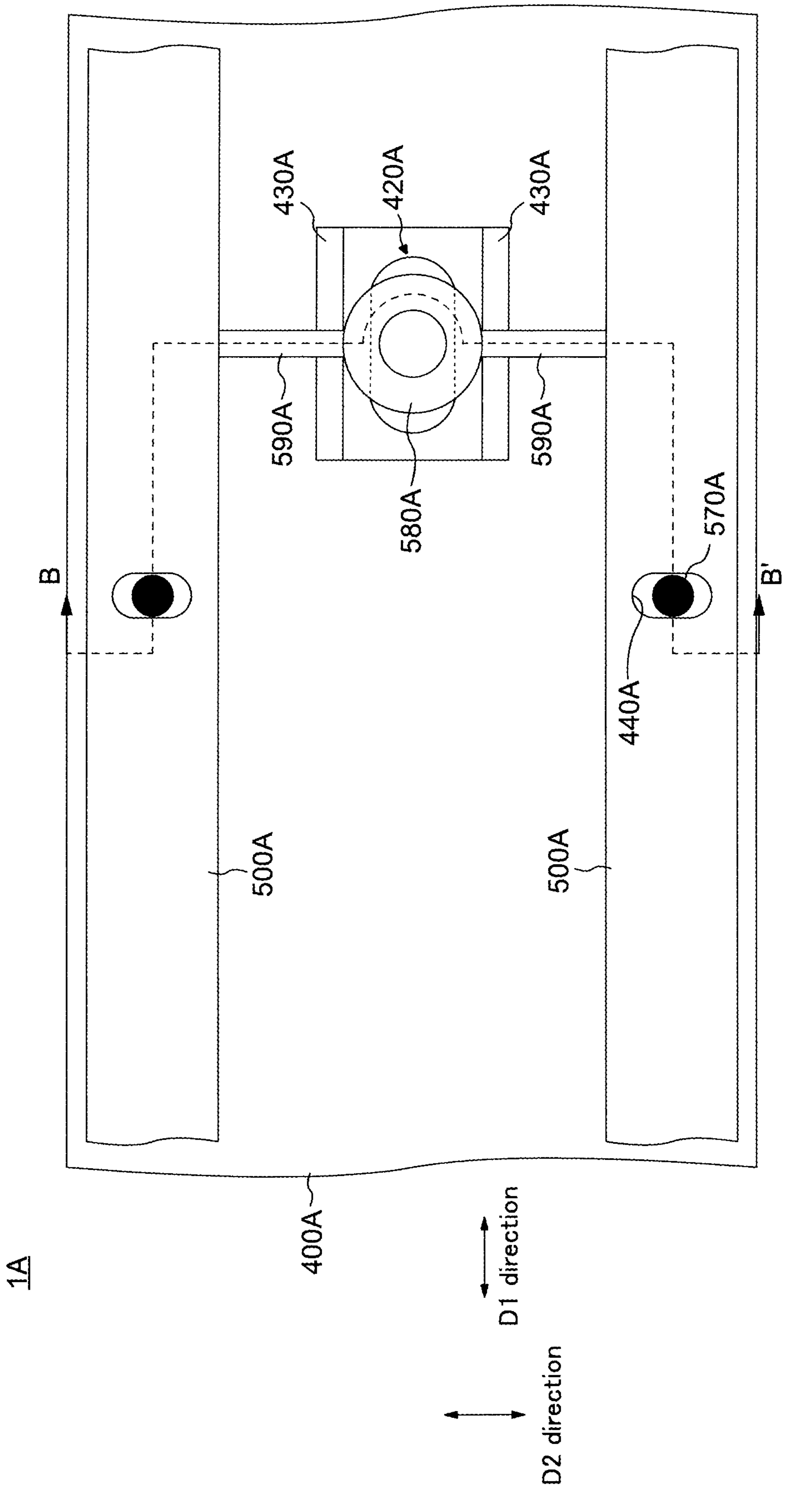
FIG. 11 is a diagram showing a state in which a stopper rail is attached to a frame in an embodiment of the present disclosure.
Figure 12:
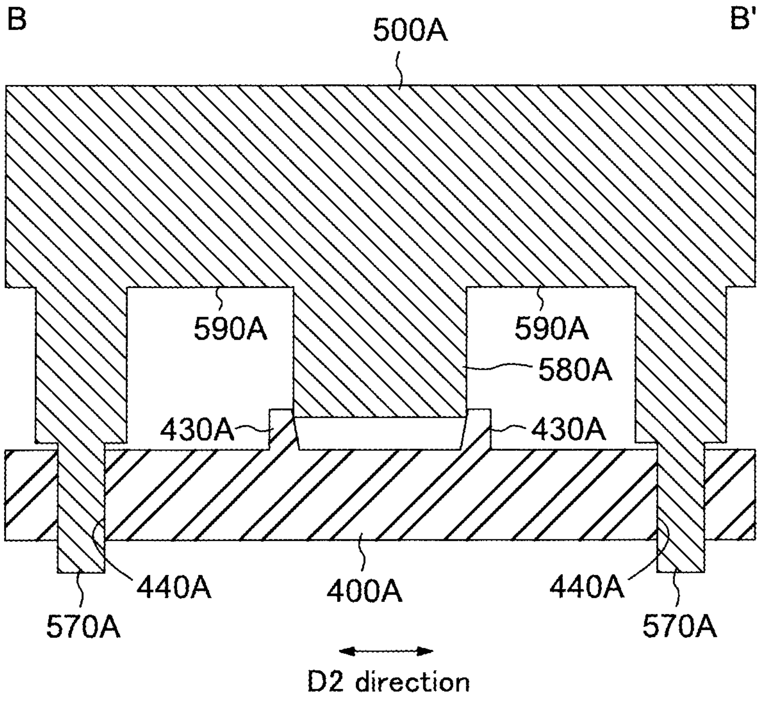
FIG. 12 is a cross-sectional view cut along a line of B-B' of FIG. 11.

A keyboard unit 1A according to a second embodiment will be described with reference to FIG. 11 and FIG. 12. FIG. 11 is a diagram showing a state in which a stopper rail is attached to a frame in an embodiment of the present disclosure. FIG. 12 is a cross-sectional view cut along a line of B-B' of FIG. 11. A stopper rail 400A and a frame 500A shown in FIG. 11 and FIG. 12 are similar to the stopper rail 400 and the frame 500 shown in FIG. 7, but differ from the configuration shown in FIG. 7 in that the positioning portion with respect to a boss 580A is connected to the frame 500A. In the following description, the same configuration as that shown in FIG. 7 will be omitted, and differences from the configuration shown in FIG. 7 will be mainly described. In the following description, when describing the same configuration as in the first embodiment, referring to FIG. 1 to FIG. 7, the alphabet “A” is added after the symbols shown in these figures.

As shown in FIG. 11, one boss 580A is connected to the frame 500A via a rib 590A. A through hole 440A is arranged on the stopper rail 400A. An insertion pin 570A is arranged in the frame 500A. The through hole 440A has a longitudinal shape in the direction D2. As shown in FIG. 12, the insertion pin 570A penetrates the through hole 440A.

Since the insertion pin 570A penetrates the through hole 440A, an external pressure in the direction D1 is supplied to the boss 580A, and when the boss 580A attempts to move in the direction D1 together with the rib 590A, the movement of the stopper rail 400A in the direction D1 is suppressed. In this case, the insertion pin 570A and the through hole 440A may be referred to as a “positioning portion” with respect to the boss 580A. That is, the positioning portion (the insertion pin 570A) is connected to the frame 500A.

In FIG. 11, although a configuration in which the through hole 440A and the insertion pin 570A are arranged at positions different from the boss 580A in the direction D1 is exemplified, the through hole 440A and the insertion pin 570A may be arranged at the same position as the boss 580A in the direction D1. A concave portion may be arranged instead of the through hole 440A. The insertion pin 570A may not penetrate the through hole 440A.

3. Third Embodiment

[3-1. Attachment of Stopper Rail 400B to Frame 500B]

Figure 13:
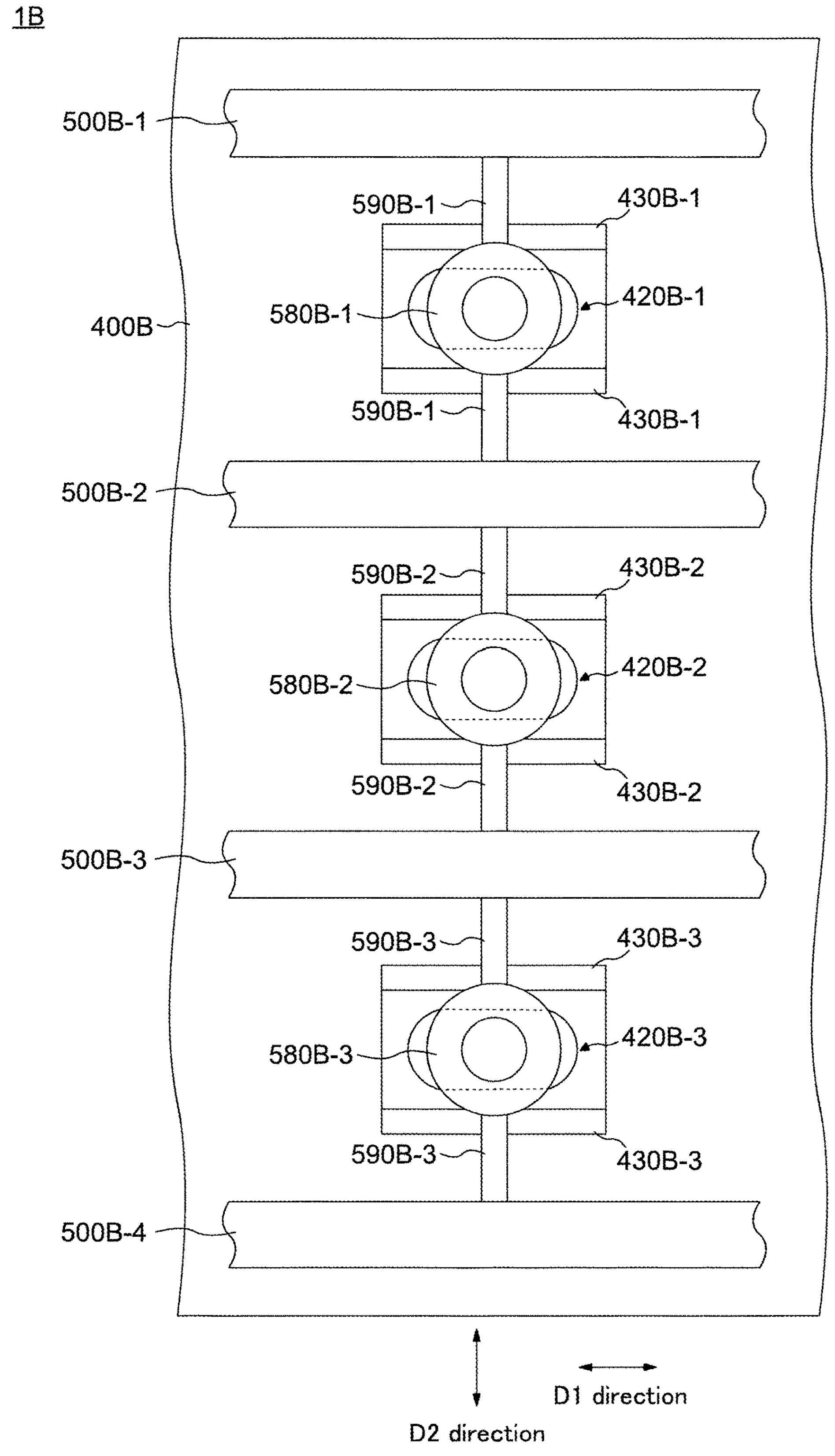
FIG. 13 is a diagram showing a state in which a stopper rail is attached to a frame in an embodiment of the present disclosure.

A keyboard unit 1B according to a third embodiment will be described with reference to FIG. 13. FIG. 13 is a diagram showing a state in which a stopper rail is attached to a frame in an embodiment of the present disclosure. A stopper rail 400B and a frame 500B shown in FIG. 13 are similar to the stopper rail 400 and the frame 500 shown in FIG. 7, but differ from the configuration shown in FIG. 7 in that a plurality of bosses 580B is aligned in the direction D2. In the following description, the same configuration as that shown in FIG. 7 will be omitted, and differences from the configuration shown in FIG. 7 will be mainly described. In the following description, when describing the same configuration as in the other embodiments, referring to FIG. 1 to FIG. 7, the alphabet "B" is added after the symbols shown in these figures.

As shown in FIG. 13, the keyboard unit 1B includes frames 500B-1, 500B-2, 500B-3, and 500B-4, bosses 580B-1, 580B-2, and 580B-3, and ribs 590B-1, 590B-2, and 590B-3. The bosses 580B-1, 580B-2, and 580B-3 are aligned in the direction D2. The boss 580B-1 is connected to the frames 500B-1 and 500B-2 between the frames 500B-1 and 500B-2 via the rib 590B-1. The boss 580B-2 is connected to the frames 500B-2 and 500B-3 between the frames 500B-2, 500B-3 via the rib 590B-2. The boss 580B-3 is connected to the frames 500B-3 and 500B-4 between the frames 500B-3 and 500B-4 via the rib 590B-3.

If the frames 500B-1, 500B-2, 500B-3, and 500B-4 do not need to be distinguished in particular, they are simply referred to as the frame 500B. If the bosses 580B-1, 580B-2, and 580B-3 do not need to be distinguished in particular, they are simply referred to as the boss 580B. If the ribs 590B-1, 590B-2, and 590B-3 do not need to be distinguished in particular, they are simply referred to as the rib 590B. The configurations of the frame 500B, the boss 580B, and the rib 590B are the same as the configurations of the frame 500, the boss 580, and the rib 590 shown in FIG. 7, and descriptions thereof will be omitted.

The boss 580B-1 and the rib 590B-1 may be collectively referred to as a "first member". The boss 580B-2 and the rib 590B-2 may be collectively referred to as a "second member". The boss 580B-3 and the rib 590B-3 may be collectively referred to as a "third member". A pressing portion 430B-1 may be referred to as a "first pressing portion". A pressing portion 430B-2 may be referred to as a "second pressing portion". A pressing portion 430B-3 may be referred to as a "third pressing portion". The positional relationship between the pressing portion 430B-1 (the first pressing portion), the pressing portion 430B-2 (the second pressing portion), and the pressing portion 430B-3 (third pressing portion) is fixed. Since the configurations of the first to third members and the first to third pressing portions are the same as those shown in FIG. 7, descriptions thereof will be omitted.

In the keyboard unit 1B according to the present embodiment, three or more bosses 580B are arranged in the stopper rail 400B and the frame 500B. Since three bosses 580B are arranged, for example, when the fastener 600 is intended to connect to the boss 580B-1, the other bosses 580B-2 and 580B-3 are respectively pressed by the pressing portions 430B-2 and 430B-3, so that it is possible to suppress the movement of the stopper rail 400B in the direction D1 and the rotation of the stopper rail 400B on a plane extending in the direction D1 and the direction D2. As shown in FIG. 7, the bosses 580 do not necessarily have to be aligned in the direction D1. In FIG. 13, although a configuration in which the bosses 580B are aligned in the direction D2 at the same position in the direction D1 is shown, the bosses 580B may be aligned in the direction D2 at different positions in the direction D1. Four or more bosses 580B may be arranged.

In the above-described embodiment, an electronic piano is shown as an example of a keyboard apparatus to which a hammer assembly is applied, and a configuration in which the hammer assembly is arranged with respect to a key is exemplified. However, the hammer assembly of the above-described embodiment may be applied to an apparatus other than an electronic piano or a member other than a key of an electronic piano.

The present disclosure is not limited to the above-described embodiments, and can be appropriately modified without departing from the spirit thereof.

What is claimed is:

1. A keyboard unit comprising:
- a frame;
- a first member connected to the frame, a rigidity of the first member in a first direction being lower than a rigidity of the first member in a second direction intersecting with the first direction; and
- a mounted member including:
  - a first pressing portion configured to suppress a movement of the first member in the first direction by pressing a part of the first member in the second direction; and
  - a positioning portion configured to suppress a movement of the mounted member with respect to the frame in the first direction.

2. The keyboard unit according to claim 1, wherein:
- the first pressing portion is a pair of first pressing portions, and
- the pair of first pressing portions is configured to suppress the movement of the first member in the first direction by sandwiching a part of the first member in the second direction.

3. The keyboard unit according to claim 1, wherein an edge portion of the first member in the second direction is connected to the frame.

4. The keyboard unit according to claim 1, further comprising:
- a second member aligned in the first direction with the first member,
- wherein a rigidity of the second member in the first direction is lower than a rigidity of the second member in the second direction,
- wherein an edge portion of the second member in the second direction is connected to the frame,
- wherein the positioning portion includes a second pressing portion configured to suppress a movement of the second member in the first direction by pressing a part of the second member in the second direction, and wherein a positional relationship between the first pressing portion and the second pressing portion in the first direction is fixed.

5. The keyboard unit according to claim 4, wherein:
the second member is arranged in a position closer to a center of the keyboard unit than the first member in the first direction, and
the positioning portion includes a pair of stoppers configured to lock to a part of the second member in the first direction.

6. The keyboard unit according to claim 1, further comprising:
a second member, a rigidity of the second member in the first direction being lower than a rigidity of the second member in the second direction, and an edge portion of the second member in the second direction is connected to the frame; and
a third member, a rigidity of the third member in the first direction being lower than a rigidity of the third member in the second direction, and an edge portion of the third member in the second direction is connected to the frame,
wherein the positioning portion includes:
a second pressing portion configured to suppress a movement of the second member in the first direction by pressing a part of the second member in the second direction,
a third pressing portion configured to suppress a movement of the third member in the first direction by pressing a part of the third member in the second direction, and
wherein a positional relationship among the first pressing portion, the second pressing portion and third pressing portion in the first direction is fixed.

7. The keyboard unit according to claim 1, wherein:
the keyboard unit has a longitudinal shape in the first direction,
the first member includes a rib and a boss,
the rib has a longitudinal shape in the second direction,
a first edge of the rib is connected to the frame,
a second edge of the rib is connected to the boss,
the boss is pressed by the first pressing portion in the second direction and directly or indirectly contacts the first pressing portion.

8. The keyboard unit according to claim 1, wherein the positioning portion includes a structure connected to the frame.

9. The keyboard unit according to claim 1, wherein the first member is adjacent to a member configured with the keyboard unit in the first direction.

10. The keyboard unit according to claim 1, wherein:
the mounted member includes a through hole,
a fastening member fixes the mounted member to the first member by penetrating the through hole, and
in the first direction, a width of the through hole is larger than a width of a part of the fastening member penetrating the through hole.

11. The keyboard unit according to claim 1, wherein;
the first pressing portion is a pair of first pressing portions,
the first member includes:
a screw hole corresponding to a screw, the screw fixing the mounted member to the first member; and
a first contacting portion and a second contacting portion in contact with the pair of first pressing portions,
the first contacting portion contacts one of the pair of first pressing portions in a clockwise direction in a circular arc around a center of the screw hole in a view of visible a bottom of the screw hole, and
the second contacting portion contacts to the other of the pair of first pressing portions in a clockwise direction in the circular arc in a view of visible a bottom of the screw hole.

12. The keyboard unit according to claim 1, wherein:
the first pressing portion is a pair of first pressing portions,
the first member includes a first contacting portion and a second contacting portion, the first contacting portion and the second contacting portion being in contact with the pair of first pressing portions, and
the first contacting portion is in contact with one of the pair of first pressing portions at two or more points.

13. The keyboard unit according to claim 12, wherein the second contacting portion is in contact with the other of the pair of first pressing portions at two or more points.

14. The keyboard unit according to claim 11, wherein:
the one of the pair of first pressing portions is recessed corresponding to a shape of the first member in the first contacting portion, and
the other of the pair of first pressing portions is recessed corresponding to a shape of the first member in the second contacting portion.

15. The keyboard unit according to claim 1, wherein:
the first pressing portion is a pair of first pressing portions, and
a movement of the first member in the first direction is suppressed by a friction between the first member and the pair of first pressing portions.

16. The keyboard unit according to claim 1, wherein:
the first pressing portion is a pair of first pressing portions that are mutually parallel, and
the pair of first pressing portions have a longitudinal shape in the first direction.

* * * * *